United States Patent [19]

Johansson et al.

[11] Patent Number: 5,563,763
[45] Date of Patent: Oct. 8, 1996

[54] CAPACITOR

[75] Inventors: Claes-Göran Johansson; Olle Winroth, both of Västerås, Sweden

[73] Assignee: Asea Brown Boveri AB, Vasteras, Sweden

[21] Appl. No.: 490,008

[22] Filed: Jun. 13, 1995

[30] Foreign Application Priority Data

Jun. 21, 1994 [SE] Sweden .................................. 9402178

[51] Int. Cl.⁶ ........................... H01G 4/30; H01G 4/232; H01G 4/224
[52] U.S. Cl. .................... 361/301.4; 361/301.3; 361/301.5; 361/306.3; 361/323; 361/313; 257/306
[58] Field of Search ............................ 361/301.1, 301.2, 361/301.3, 301.4, 301.5, 306.3, 309, 313, 323, 328; 257/306

[56] References Cited

U.S. PATENT DOCUMENTS 3,484,664 12/1969 Liddicoat .................. 361/323
4,472,758 9/1984 Goto et al. .................. 361/288

Primary Examiner—Leo P. Picard
Assistant Examiner—Anthony Dinkins
Attorney, Agent, or Firm—Watson, Cole, Stevens & Davis, PLLC

[57] ABSTRACT

A capacitor for temporary storage of electrical energy comprising at least two capacitor elements (2) composed of electrodes (5) which are separated by one or more dielectrics (6), and especially a power capacitor for high voltage. When the capacitor is being loaded, electrostatic forces give rise to mechanical forces between the electrodes in the capacitor. The forces give rise to vibrations which radiate as sound from the surface of the capacitor. Between, or adjacent to, packages (10) of compressed capacitor elements (2), there are placed one or more active or passive spring elements (11), which are adapted to change the natural frequencies of the capacitor. In this way, the oscillation resistance of the capacitor may be changed at the frequency ranges where the force is acting. The vibrations in the surface layer of the capacitor decrease, resulting in reduced sound radiation from the capacitor.

26 Claims, 2 Drawing Sheets

CAPACITOR

TECHNICAL FIELD

The present invention relates to a capacitor for temporary storage of electrical energy comprising at least two capacitor elements wound from electrically conducting and electrically insulating foils, and especially a power capacitor for high voltage. Such power capacitors are used, inter alia, in filters where, together with reactors and resistors, they form a resonance circuit to filter away harmonics on the electric distribution network. Usually, a large number of power capacitors are stacked in high stands, insulated towards ground, where each plane represents a certain potential.

BACKGROUND ART

A power capacitor of the above-mentioned kind is built up of a number of sub-capacitors, so-called elements. Each element comprises a plurality of very thin layers of electrodes of thin aluminium foils separated by films of a dielectric material wound into a roll, which is flattened to be able to be optimally stacked into a package. Packages are placed in a capacitor tank filled with an electrically insulating fluid. The elements are connected together into a matrix and connected to two insulated bushings, the number of series-connected and parallel-connected elements, respectively, being determined by the capacitance desired in the capacitor. Usually, a fuse is also connected in series with each element. In addition to elements and fuses, the capacitor also includes special resistors for discharging residual charges.

When two separated, electrically conducting plates are charged with charges of opposite potentials, an electrostatic field is generated. In this field a mechanical force arises between the plates, which attracts the plates towards each other. When the charge is conducted away, the attractive force ceases whereas it again arises if the plates are charged with the reverse polarity. When a charge is applied to the plates at a certain frequency, each time with an alternating potential, an alternating mechanical force therefore arises between the plates. This force gives rise to a mechanical movement of the plates, the frequency of this movement being twice the frequency of the applied alternating charge. For a wound capacitor element consisting of a very large number of layers, the movement of each inner layer is added to the outer layer, whereby the movement in the outer layer may become very large. A drawback with such a capacitor element is, therefore, that it starts oscillating when being loaded, whereby vibrations in the surface layer of the capacitor element cause radiation of unwanted sound or noise.

A common measure for reducing noise from capacitors of the above-mentioned kind, comprising a plurality of elements which when loaded generate vibrations which are transported to the outside of the capacitor tank from where they cause sound radiation, is to screen the capacitors or enclosing them completely or partially. A problem which arises when screening the capacitors is that, since the capacitor often have a considerable potential difference in relation to ground, the screening must be placed at a certain safety distance. A larger distance between the screen and the sound source results in inferior screening effect and, in the case of enclosed capacitors, large casings. This increases both weight and consumption of material. These measures are costly.

Within the audio technique, a capacitor is known, from a patent JP 60-16 739 (1985), which comprises a capacitor element wound from electrodes and plastic films and which is placed in a casing with an inner and an outer layer. The inner layer may be either of elastic or non-elastic material. The outer layer may also either be of elastic or non-elastic material but must be of a kind opposite to that of the inner layer. This capacitor design does not solve the acoustic problem of the capacitor under discussion, which comprises several capacitor elements and which is so large that a layer of the above-mentioned kind would have no damping effect on the sound generation.

SUMMARY OF THE INVENTION

The invention aims to provide a capacitor of the kind described above, wherein the internal oscillations of the capacitor, when loaded, are suppressed, the capacitor thus generating less sound. This is achieved by arranging between capacitor elements or bundles of capacitor elements, inside a capacitor tank, one or more weak spring elements, thus changing the natural frequencies of the capacitor body. The oscillation resistance of the capacitor body can thus be increased at the frequency ranges within which the force is acting, whereby the capacitor generates less sound. Such a spring element may comprise an evacuated, tight container, preferably of metal. The container comprises a passively or actively operating resilient (or spring) device. By an actively operating spring device, a force-absorbing element is meant, stiffness of which may be adjusted by external controllable energy supply.

BRIEF DESCRIPTION OF THE DRAWINGS

The invention will be described in greater detail by description of an embodiment with reference to the accompanying FIGURES, wherein.

DESCRIPTION OF THE PREFERRED EMBODIMENTS

Figure 1:
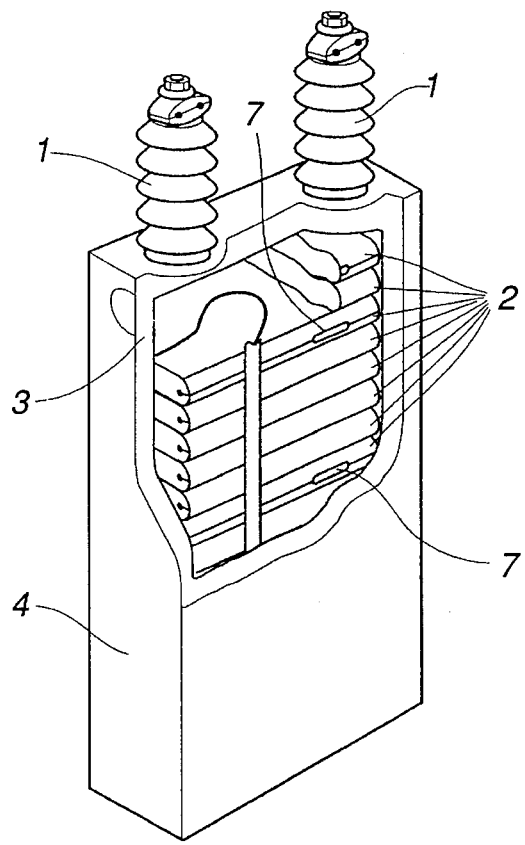
FIG. 1 shows a partially cut-open power capacitor.
Figure 2:
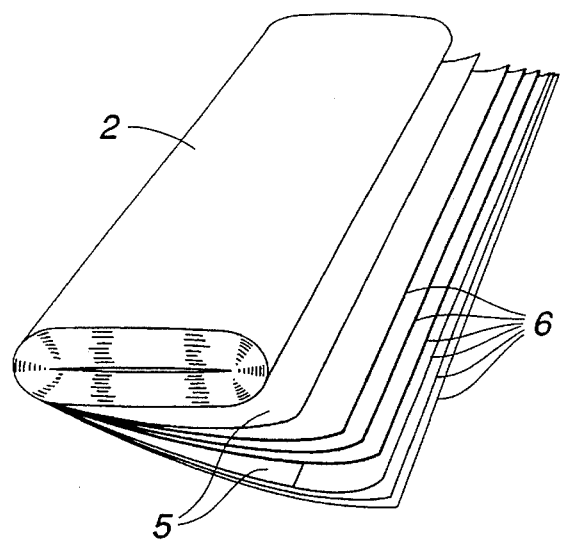
FIG. 2 shows a capacitor element, FIG. 3 schematically how a plurality of capacitor elements are connected together.

FIG. 1 shows a power capacitor comprising a capacitor tank 4 which is provided with bushings 1 and which encloses a plurality of capacitor elements 2, impregnated and surrounded by electrically insulating fluid, which are maintained insulated from the capacitor tank 4 by an insulating enclosure 3. FIG. 2 shows how a capacitor element 2 is wound from two electrically conducting metal foils, preferably of aluminium, separated by three electrically insulating films 6 of dielectric material. The capacitor elements 2 comprise very long foils and films, respectively, which are wound into a roll. To save space in the tank 4, the rolls are compressed and stacked to form a package 10 (FIG. 4). FIG.

3 shows how the elements 2 have been electrically interconnected by means of fuses 7 and discharge resistors 8 and have been connected to the bushings 1.

It is known that sound generation from a mechanical structure, such as, for example, a capacitor body, depends partly on the applied force, partly on the dynamic properties of the structure. If the frequency of the mechanical force coincides with any of the natural frequencies of the structure, huge deflections arise. These deflections cause vibrations, which via the insulating fluid reach the capacitor tank from which the sound is radiated. The intensity of the sound being generated depends on the intensity of the force and on the structural damping of the natural frequency. Inversely, if the force and the resonance can be mismatched such that their respective frequencies do not coincide, less sound will be generated in that the resistance of the structure to oscillate at the frequency of the force is increased. By damping the structure while at the same time aiming for the natural frequencies and the frequencies of the force being located far away from each other, the sound can be reduced. In most situations the frequency pattern of the force is given, and therefore a modification of the structural behaviour is the ultimate solution. The natural frequencies of a composite structure, however, are difficult to estimate.

Figure 4A:
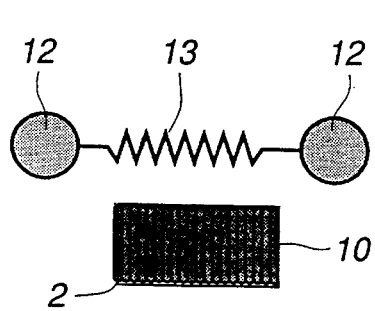
FIG. 4a shows how a known capacitor package is built up, and its mechanical equivalent.

By numerous acoustic measurements of capacitors under specific load, a mathematical model has been developed for calculating sound radiation from a capacitor. In that connection it has been found that the mechanical properties of the capacitor are dominated by a resonant behaviour which can be directly traced to the fundamental natural frequency for longitudinal waves in the capacitor package 10. The natural frequency is proportional to the square root of the quotient of the stiffness of the capacitor package and the density thereof and inversely proportional to the length of the package. When the package is divided and a weak spring element is placed between the parts, the natural frequency for the package is changed. By choosing stiffness of the spring, the natural frequency can be altered and suitably chosen in relation to the frequencies of the force. FIG. 4a schematically shows a capacitor package and its corresponding mechanical equivalent. The capacitor package 10 consisting of a number of capacitor elements 2 can be viewed mechanically as two large masses 12 interconnected by a spring 13.

Figure 4B:
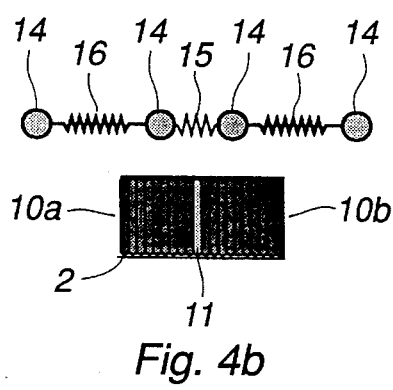
FIG. 4b shows how a capacitor package with a weak spring element according to the invention is built up, and its mechanical equivalent.
Figure 3:
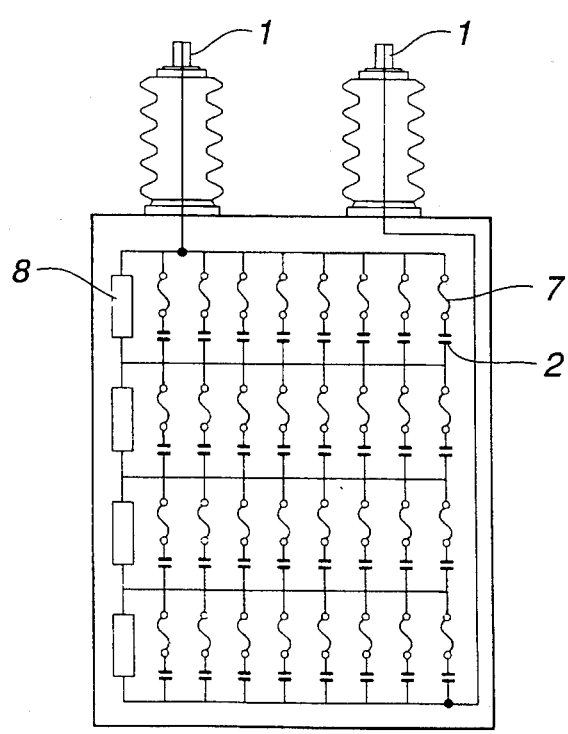

FIG. 4b shows the same capacitor package 10, which according to the invention is divided into two parts 10a, 10b, separated by a weak spring element 11. FIG. 4b also shows the mechanical equivalent circuit diagram of this divided capacitor package. Since the original capacitor package is divided by a weak spring element 11, it can, from a mechanical point of view, be regarded as two smaller capacitor packages according to the above, connected together by a weak spring. The smaller capacitor packages are thereby given smaller masses 14 and, because of the shorter package, a stiffer spring 16.

Figure 5:
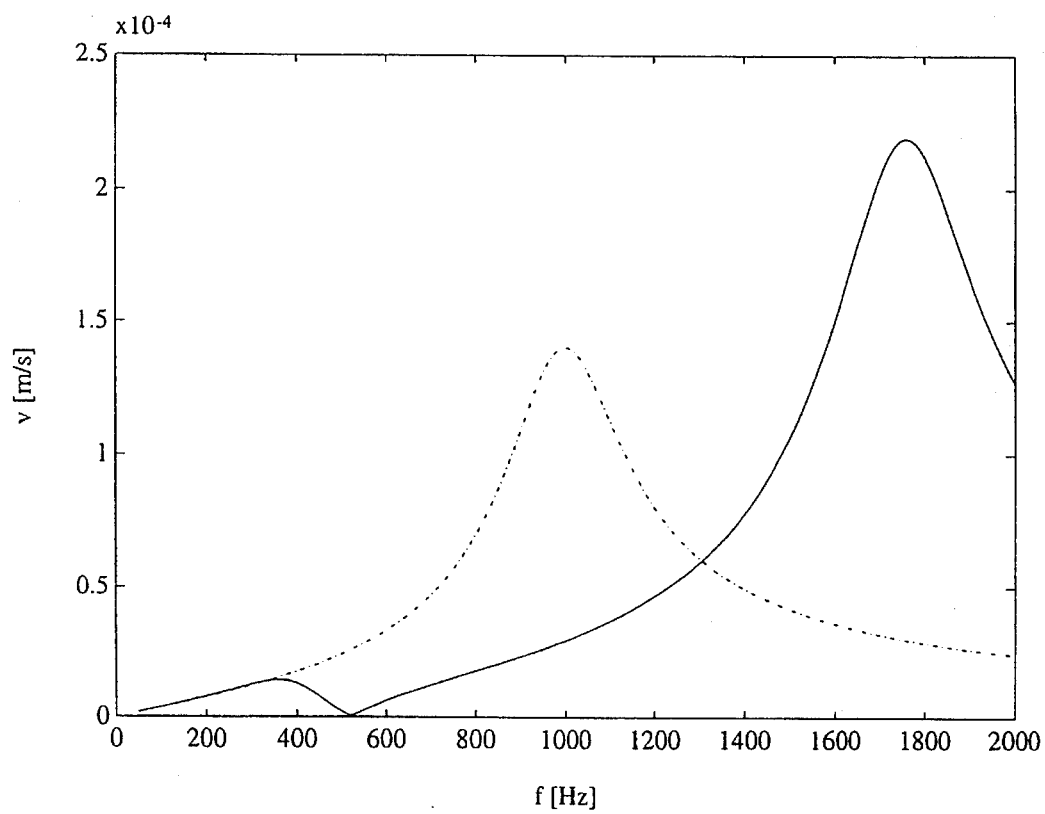
FIG. 5 shows a diagram with vibration velocity versus frequency of a known capacitor package and of a capacitor package comprising a weak spring element.

The diagram in FIG. 5 shows vibration velocity as a function of frequency. The two curves in the diagram constitute the calculated result of the vibration velocity at the outer ends of the capacitor package at an applied force, sweeping by frequency. The dash-dotted curve represents the homogeneous capacitor package 10 which has a resonance at 1000 Hz. The unbroken curve represents the capacitor package 10a, 10b, divided by a weak spring element 11, and has two resonances, one at 350 Hz and one at 1750 Hz. The result also shows that in the latter case an anti-resonance occurs at 500 Hz, which is a result of the mechanical system, divided by spring elements, receiving more degrees of freedom. At such an anti-resonance, the oscillation resistance is infinitely great at the end surfaces of the capacitor package and hence the movement is, in principle, zero whereas the spring element takes up the whole movement.

Figure 6:
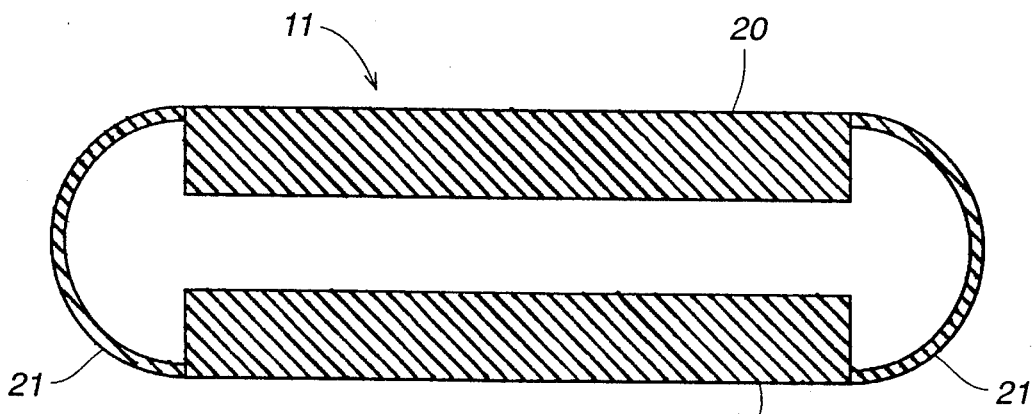
FIG. 6 shows a cross section of a spring element according to the invention.

FIG. 6 shows an embodiment of the spring element 11. It consists of an evacuated plane-parallel, tight container of metal, the upper side and underside of which in FIG. 6 are made of thick, stiff plates 20, and the edges 21 of which on all sides are made of thin sheet strips of semicircular cross section fixed to each plate 20. The completed spring element has a shape like a parallelepiped formed with rounded edges and with the same plane dimensions as the capacitor packages.

With knowledge of the forces to which a capacitor will be subjected, the mechanical construction of a capacitor can be chosen in an optimum way, by the introduction of one or more weak springs, such that the natural frequencies are located far away from the frequencies of the critical force components. An optimum mechanical embodiment is then obtained when the introduced spring elements are dimensioned such that anti-resonances occur at the same frequencies as the dominating forces.

As spring elements or force-absorbing elements, a plurality of materials and embodiments are possible, both with passive and active resilient properties. Passive spring elements are such devices where the resilient properties are determined by the shape and material of the springs and cannot be changed by external influence. An active spring element may be built up in the same way as a passive element but of a material whose properties, such as volume or shape, may be changed by external energy supply, for example magnetostrictive or piezoelectric materials. As in the embodiment shown, the spring element may be constructed as a hollow parallelepiped of some tight material corrodibly resistant to the insulating fluid, such, as, for example, metal or plastic. The spring element comprises the desired force-absorbing properties and may either itself constitute the resilient device, or a device with the desired properties may be enclosed in a container which constitutes the spring element.

I claim:

1. A capacitor for temporary storage of electrical energy, comprising:

at least two capacitor elements composed of electrodes separated by one or more dielectrics;

at least one spring element positioned between, or adjacent to, the at least two capacitor elements; and said at least one spring element having a stiffness for reducing the external vibrations of the capacitor in the presence of a forced oscillation and thereby reducing sound radiation from the capacitor.

2. A capacitor for temporary storage of electrical energy according to claim 1, wherein each of said at least two capacitor elements comprises a roll wound from metal foils and dielectric films.

3. A capacitor for temporary storage of electrical energy according to claim 1, wherein the at least two capacitor elements are stacked into capacitor packages, and said at least one spring element separating said capacitor packages from one another.

4. A capacitor for temporary storage of electrical energy according to claim 2, wherein the at least two capacitor elements are stacked into capacitor packages, and said at least one spring element separating said capacitor packages from one another.

5. A capacitor for temporary storage of electrical energy according to claim 1, further comprising an electrically insulating fluid surrounding said at least two capacitor elements.

6. A capacitor for temporary storage of electrical energy according to claim 2, further comprising an electrically insulating fluid surrounding said at least two capacitor elements.

7. A capacitor for temporary storage of electrical energy according to claim 3, further comprising an electrically insulating fluid surrounding said at least two capacitor elements.

8. A capacitor for temporary storage of electrical energy according to claim 4, further comprising an electrically insulating fluid surrounding said at least two capacitor elements.

9. A capacitor for temporary storage of electrical energy according to claim 5, further comprising a capacitor tank comprising electrical bushings and protective insulation for housing said at least two capacitor elements, said at least one spring element and said electrically insulating fluid.

10. A capacitor for temporary storage of electrical energy according to claim 6, further comprising a capacitor tank comprising electrical bushings and protective insulation for housing said at least two capacitor elements, said at least one spring element and said electrically insulating fluid.

11. A capacitor for temporary storage of electrical energy according to claim 7, further comprising a capacitor tank comprising electrical bushings and protective insulation for housing said at least two capacitor elements, said at least one spring element and said electrically insulating fluid.

12. A capacitor for temporary storage of electrical energy according to claim 8, further comprising a capacitor tank comprising electrical bushings and protective insulation for housing said at least two capacitor elements, said at least one spring element and said electrically insulating fluid.

13. A capacitor for temporary storage of electrical energy according to claim 9, wherein said at least one spring element comprises at least one evacuated, tight container of metal or plastic.

14. A capacitor for temporary storage of electrical energy according to claim 10, wherein said at least one spring element comprises at least one evacuated, tight container of metal or plastic.

15. A capacitor for temporary storage of electrical energy according to claim 11, wherein said at least one spring element comprises at least one evacuated, tight container of metal or plastic.

16. A capacitor for temporary storage of electrical energy according to claim 12, wherein said at least one spring element comprises at least one evacuated, tight container of metal or plastic.

17. A capacitor for temporary storage of electrical energy according to claim 1, wherein said at least one spring element comprises a passively operating spring device, the material and shape of which determines the spring characteristics thereof.

18. A capacitor for temporary storage of electrical energy according to claim 3, wherein said at least one spring element comprises a passively operating spring device, the material and shape of which determines the spring characteristics thereof.

19. A capacitor for temporary storage of electrical energy according to claim 4, wherein said at least one spring element comprises a passively operating spring device, the material and shape of which determine the spring characteristics thereof.

20. A capacitor for temporary storage of electrical energy according to claim 11, wherein said at least one spring element comprises a passively operating spring device, the material and shape of which determine the spring characteristics thereof.

21. A capacitor for temporary storage of electrical energy according to claim 12, wherein said at least one spring element comprises a passively operating spring device, the material and shape of which determine the spring characteristics thereof.

22. A capacitor for temporary storage of electrical energy according to claim 1, wherein said at least one spring element comprises a spring device which is actively operated by external energy supply.

23. A capacitor for temporary storage of electrical energy according to claim 3, wherein said at least one spring element comprises a spring device which is actively operated by external energy supply.

24. A capacitor for temporary storage of electrical energy according to claim 4, wherein said at least one spring element comprises a spring device which is actively operated by external energy supply.

25. A capacitor for temporary storage of electrical energy according to claim 11, wherein said at least one spring element comprises a spring device which is actively operated by external energy supply.

26. A capacitor for temporary storage of electrical energy according to claim 12, wherein said at least one spring element comprises a spring device which is actively operated by external energy supply.

* * * * *